United States Patent
Gil-Castillo

[11] 3,762,049
[45] Oct. 2, 1973

[54] REMOVABLE DENTURE CONNECTION

[76] Inventor: Arturo Gil-Castillo, San Jose de Ocoa, Dominican Republic

[22] Filed: Apr. 20, 1972

[21] Appl. No.: 246,064

[52] U.S. Cl. .................................................. 32/5
[51] Int. Cl. ............................................. A61c 13/22
[58] Field of Search ............................... 32/5, 6, 7

[56] References Cited
UNITED STATES PATENTS
2,545,316  3/1951  Stark et al. ........................ 32/5
3,171,202  3/1965  Lasky ................................. 32/5

*Primary Examiner*—Robert Peshock
*Attorney*—Mason, Mason and Albright

[57] ABSTRACT

A removable artifical tooth (or teeth) and gum prothesis is attached to a pier tooth crown by means of a tapered tongue and groove connection. A spring in the tongue part of the connection is adapted to bear against depression in the wall of the groove or socket receiving the tongue part to form a dedent type connection. The spring includes a shank which extends away from the tongue portion in the direction of the gum into the gum prosthesis where it is embedded and at about a 45° angle relative to the face of the tongue. The inner part of the spring which engages the depression in the wall of the socket extends substantially in the direction of the gum and bears resiliently against the depression. Alternatively, the spring may have three primary parts, the first of which extends from the direction of the gum at a 45° angle in a channel within the tongue part to its face which contacts the socket wall, a second spring part extends approximately parallel to the face of the tongue part way from the gum and engages a depression in the wall portion of the socket, and a third part extends at a 45° angle away from the gum and tongue face into a further channel of the tongue part. The channels for the latter spring are formed in part by backing plate which is, at least originally, in approximately the shape of a truncated triangle with the truncated portion adajcent and to the rear of the second spring part so that the second spring part can resiliently move towards the truncated part. Such plate is soldered in place and a portion is thereafter removed whereby it defines in part the channels for the first and third spring parts.

12 Claims, 13 Drawing Figures

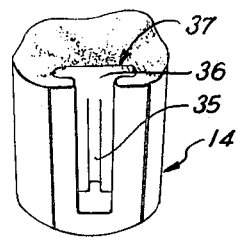
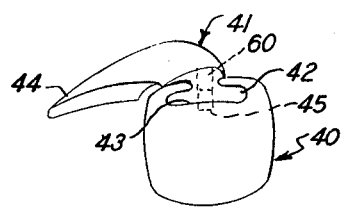
FIG. 7   FIG. 8
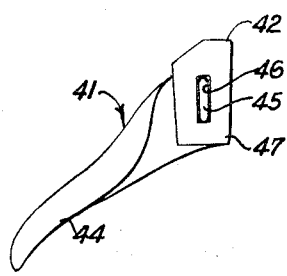
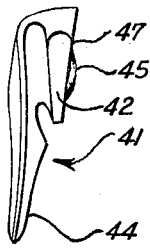
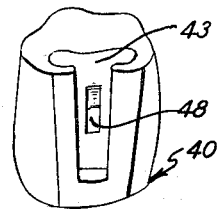
FIG. 9   FIG. 11
FIG. 10
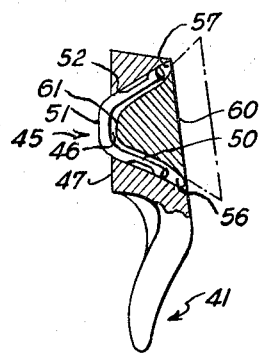
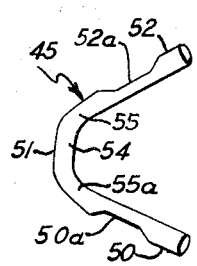
FIG. 13
FIG. 12

REMOVABLE DENTURE CONNECTION

BACKGROUND OF THE INVENTION

The invention relates to a removable denture connection and particularly to the type wherein the denture is removably held in place by a tongue and groove connection, the groove or socket extending from a crown of a pier tooth and the tongue being generally T-shaped as seen from above and tapering.

It has been a practice for a yieldable interlock between the tongue and groove, that a spring of one type or another is provided for the tongue which bears against the adjacent surface of the groove which receives the tongue which may or may not have a corresponding depression.

As is well known, dental bridges are generally anchored between two natural teeth or to a single tooth. Various devices and techniques exist to establish removable bridges in the mouth so that they will function to masticate food and at the same time be removable for cleaning and other purposes. One type is a tongue and groove connection wherein the groove is disposed at one side of a crown over an existing tooth and the tongue fits in the groove so that the bridge can be removed by lifting same in a direction away from the underlying gum. With such connections it is not uncommon to provide, usually in the tongue or socket portion, a spring which may be received in a corresponding recess in the wall of the groove so that a dedent type of connection is created. Such connections have, however, presented several problems. One is that the spring may prove too strong or weak for its purpose whereby either the denture is not easily removable or it will become dislodged in use. A definite need thus exists and has existed for many years for a bridge connection which will offer permanent stability for denture bridges and wherein the spring tension may be adjusted without undue difficulty so that the denture may be manually removed by the wearer.

SUMMARY OF THE INVENTION

The dental bridge of my invention comprises a precision attachment wherein a crown is received over a pier tooth which includes a groove or female part to receive the tongue or male part also known as a socket. The tongue part has a tubular member which extends away from the face of the tongue at a slant of about 45° towards the location for receiving the gum into the adjoining bridge. This tubular member in turn carries a spring portion having a long pointed shank that is slidably received in the channel formed by the tubular member and extends from such tubular member into the adjoining bridge whereby both the shank of the spring and the tubular member are anchored within the tooth prosthesis. On the other end, the shank of the spring extends through an opening in the face of the tongue member and a further but shorter portion of the spring extends towards the gum partly within a groove in the face of the tongue member and partly outwardly thereof. When the tongue together with the spring and the denture is received in the socket, the shorter portion of the spring resiliently bears against the wall of the socket. A recess or depression is provided in the socket wall so that when the denture is in its desired position, the outwardly extending portion of the spring bears in the depression and a dedent type connection is provided. The groove has a tapering form which closely fits within a tapered socket whereby an anatomic contour of a tooth may be provided in the crown. An arm extends from the portion which includes the tongue which assists in stablizing the adjacent prosthesis and is provided for attachment to frames of the various types used for removable bridges. The spring is easily removable by the technician and can be replaced in a matter of minutes to provide the desired resilient connection between the prosthesis and the crown over the pier tooth. However, due to the fact that the shank of the spring is received frictionally within the prothesis, it is not likely to be unintentionally dislodged by the user. Moreover, the location of the spring contributes to the stability of the prothesis and it is possible to use a single attachment of the type disclosed herein for certain types of protheses. In a further embodiment which is more suitable for tongue and groove attachments wherein there is not an enjoining prothesis but it is desired to provide stability and an attachment for a frame part of a bridge, the tubular part or nipple extending away from the face of the groove is not provided but, nevertheless, a channel extends from the tongue face in which the same direction and from the same space. However, the groove which is provided in the channel which instead of extending towards the gum from the opening for the spring extends away from same to a further opening for a further channel which extends away from the face of the groove at an angle of about 45° and about 90° relative to the first mentioned channel. The channels are made by initially forming a vertical groove which is generally triangular in section from the rear of a tongue part towards its face whereby an imaginary apex of the triangle would extend through the opening in the face of the tongue part. The channels are then defined by inserting into the vertical groove a plate having the same thickness as the groove, the plate having substantially the shape of a truncated triangular or, perhaps more accurately, a volcanic like cross-section. With a U-shaped member (or spring) previously inserted, to provide spacing for the channels the plate may be easily soldered in place and the rear portion ground flush against the rear of the tongue part. A U-shaped spring located in the channels so formed thus has arms in each of the channels and serves to function as with the previously described spring, to hold or establish removable bridges in the mouth. The spring has on both sides away from the front portion, slanted parts so that the action of insertion and removal of the spring may be obtained with increased facility while at the same time the dedent arrangement provides a strong connection between the crown over the pier tooth and the prosthesis. The pressure for such a spring can be adjusted simply and quickly and there is no problem in replacing the spring which may be available in various strengths. Replacement is made in case of breakage or if the spring weakens with use.

Other adaptabilities and capabilities will appear as the description progresses, reference being had to the accompanying drawings, in which:

3

Figure 2:
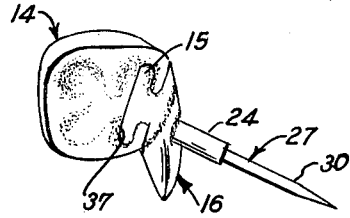
FIG. 2 is a plan view which shows the crown of FIG. 1 together with the tongue member without the prosthesis connected thereto.
Figure 3:
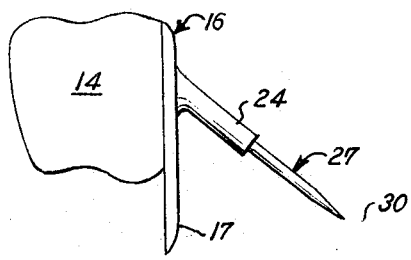
Figure 4:
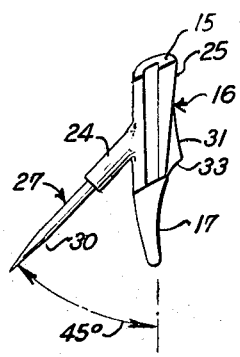
Figure 5:
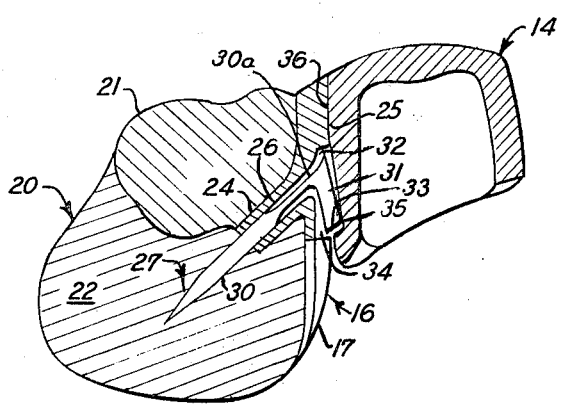
Figure 6:
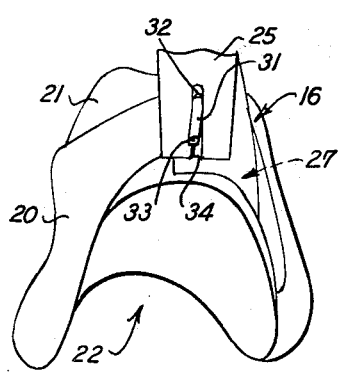

FIG. 3 is a side view of the crown and tongue member shown in FIG. 2;

FIG. 4 is an elevational detail view of the tongue member;

FIG. 5 is a cross-sectional view of the connection of the invention between the crown and prosthesis;

FIG. 6 is a front view showing the tongue member connected to the prosthesis;

FIG. 7 is a perspective front view of the crown showing the socket and indentation for the spring in the wall portion of the socket;

FIG. 8 is a plan view of a further embodiment of the invention wherein a tongue member is received in a crown;

FIG. 9 is a front view of a tongue member shown in FIG. 8;

FIG. 10 is a side elevational view of the tongue member shown in FIGS. 8 and 9;

FIG. 11 is a front perspective view of the crown of the further embodiment showing the indentation in the wall portion of the socket.

FIG. 12 is a cross-sectional view of the tongue member shown in FIGS. 8 – 10; and FIG. 13 is an enlarged detail view of the spring seen in the cross-sectional view of FIG. 12.

DESCRIPTION OF THE PREFERRED EMBODIMENTS

Figure 1:
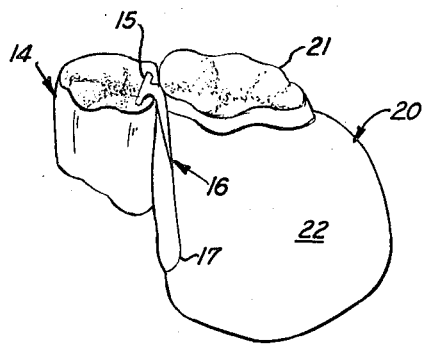
FIG. 1 shows in perspective the crown over a pier tooth with the tooth prosthesis attached thereto by a connection in accordance with the invention.

Referring to FIG. 1, it will be noted that a crown 14 receives a tongue part 15 of the tongue member 16 which includes an arm 17 for attachment by soldering or other suitable means to a frame of a denture bridge. The prosthesis 20 comprises an artificial tooth 21 and a saddle part 22 which forms a base for the artificial tooth and is made of plastic, a precious metal or other material to encase tooth 21 and to prevent injury from contact with the gums of the user. The plastic or other material is conventional and used in a conventional manner to anchor the artificial tooth as well as protect the gums of the user.

As may be seen in FIGS. 2 – 5, tongue member 16 includes the tubular member or nipple 24 which extends at an angle of 45° to 75° relative to and away from face 25 of tongue part 15. Nipple 24 includes a cylindrical channel designated 26 which receives a spring 27 comprised of a shank body or first spring portion 30 which includes a neck portion 30a which can be flat or cylindrical and a head or second spring portion 31 which extends partly in a groove 34 leading from an opening 32 of channel 26 and generally in the direction of the underlying gum. It is to be noted that second spring portion 31 extends slightly outwardly of groove 34 whereby it may be resiliently received against an indentation 35 in the rear wall portion 36 or 37 in crown 14 whereby a dedent arrangement is provided. It will be further noted that the first spring part 30 is sharpened on its extreme end and together with nipple 24 is embedded in saddle part 22. Although spring 27 can be easily removed from the prosthesis 20 when same is removed from the mouth, by the proper dental instruments, the frictional engagement of the pointed first spring portion 30 within the saddle part 22 prevents its accidental dislodgement when the prosthesis 20 is removed by the user. It will also be noted that the tongue part 15 is tapered both as seen from face 25 (FIG. 6) and the side (FIG. 4) and it is to be appreciated that the socket 37 is similarly tapered so that tongue part 15 is, when in position in socket 37, in full engagement therewith and thus firmly secured and anchored to crown 14. The connection is thus practically unbreakable and offers a permanent stability in upper as well as lower bridge dentures. Due to the construction, friction or wear on the attachment is almost non-existent. The prosthesis 20 is removed from crown 14 by moving same in a direction away from the gum parallel to the engagement of face 25 with the wall portion 36. The second spring part 31 then is deformed inwardly and, as previously indicated, it is important that a spring of suitable tension be chosen so that the prosthesis 20 is properly secured without being unduly difficult to remove. It will be seen that the end 33 of the spring portion 31 is ground at a bias whereby when tongue part 15 is inserted in socket 37, biased end 33 is moved inward by its contact with wall portion 36 and it thus does not tend to dig into the top of the crown 14.

Referring now to FIGS. 8 – 13, a further embodiment of the invention is shown wherein, as seen in FIG. 8, a crown 40 receives a tongue member 41 which includes a tongue part 42 received in a socket 43. Also, an arm 44 utilized for connection to frame parts of the bridge is included in tongue member 41. A roughly U-shape spring 45 extends from a groove 46 as shown best in FIG. 12. The tongue part 42 is tapered and received in the socket 43 with the same snug fit as described for the first mentioned embodiment. At the rear of the socket 43, a depression 48 is provided at a location so as to receive the protruding portion of spring 45 whereby a dedent arrangement is formed when tongue part 42 is positioned fully within the socket 43. It will be noted that spring 45 includes a first spring portion 50, a second spring portion 51 and a third spring portion 52. Spring portions 50 and 52 are optionally provided with gullets 50a and 52a respectively which govern the resilience of spring 45. The spring portion 51 includes three parts. The central part of portion 51 as seen in FIG. 13 is designated by reference number 54 and, when in position as shown in FIG. 12 in tongue member 41, it is parallel to the face 47 of tongue part 42. At either side of central part 54, slanted parts 55 and 55a are provided. The central part 54 extends slightly outwardly from face 47 and when in position as shown in FIG. 8, bears in and against depression 48. The slanted parts 55 and 55a are inclined in the direction of face 47 so that the outer surfaces are practically parallel thereto and, in any event, do not extend beyond face 47 where they join portions 50 and 52. These parts 55 and 55a thus facilitate the insertion and removal of tongue part 42 into socket 43. From FIG. 12, it will be noted that the first spring portion 50 is received in a first channel 56 and the third spring portion 52 is received in a second channel 57. The channels 56 and 57 and the groove 46 are formed by first making a slot in the rear of tongue part 41 and thereafter soldering therein a plate 60 which, as seen in FIG. 12, has a profile which is roughly a truncated triangle or similar to the profile of a volcano wherein the groove 46 is formed by the truncated portion 61 of plate 60. The sides of the triangle are spaced so as to form channels 56 and 57 for receipt of spring 45 and plate 60 is soldered in place to become, in effect, a part of tongue member 41. The portion of plate 60 shown in dotted lines in FIG. 12 is ground away so as to give the tongue member 41 a smooth contour. In this embodiment only a small center groove 46 is required in tongue member 41. In practice, spring 51 can be replaced in a matter of minutes and, as with the previous embodiment, the resilience of the particular spring 45 depends upon the firmness desired for the connection between tongue member 41 and crown 40 as provided by the dedent arrangement of spring part 51 being received in depression 46, as well as precision fit which otherwise exists between tongue part 42 and socket 43.

It is to be understood that the various materials utilized in construction of the embodiments described herein are those which are usual and conventional in dental practice and which do not react in any significant degree with normal substances to be found in the oral cavity. Thus the invention may be utilized in combination with or as part of both custom made and commercial type attachments, ¾ crown structures, veneer and full gold crowns.

Having thus described my invention, what I claim as new and desire to secure by Letters Patent of the United States is:

1. In a removable denture, the combination of a socket member for attachment for a pier tooth and a tongue part attached to an artificial tooth prosthesis, said tongue part slidably receivable by said socket member whereby said prosthesis is received in its desired location with said tongue part engaging a wall portion opposite said prosthesis of said socket member, a spring member extending from said tongue part resiliently bearing against said wall portion, said tongue part having a channel which substantially lies in a plane containing a longitudinal axis of said tongue part with the longitudinal axis of said channel being substantially biased relative to the surface of said tongue part engaging said wall portion and having an opening at said surface, a groove in said surface extending from said opening in a direction parallel to the longitudinal axis of said tongue part, a replaceable spring received in said channel having two portions, the first of said portions being a shank slideably received in said channel and the second of said portions extending at an angle from said first portion and received at least in part in said groove whereby when said tongue part is received in said socket member, said second portion resiliently bears against said wall portion.

2. Structure in accordance with claim 1 wherein said channel is biased relative to said surface of said tongue part at an angle of about 45°.

3. Structure in accordance with claim 1 wherein said channel is biased relative to said surface of said tongue part at an angle of between 40° – 80°.

4. In a removable denture, the combination of a socket member for attachment for a pier tooth and a tongue part attached to an artificial tooth prosthesis, said tongue part slidably receivable by said socket member whereby said prosthesis is received in its desired location with said tongue part engaging a wall portion of said socket member, a spring member extending from said tongue part resiliently bearing against said wall portion, said tongue part having a channel which substantially lies in a plane containing a longitudinal axis of said tongue part with the longitudinal axis of said channel being biased relative to the surface of said tongue part engaging said wall portion and having an opening at said surface, a groove in said surface extending from said opening in a direction parallel to the longitudinal axis of said tongue part, a spring received in said channel having two portions, the first of said portions being a shank received in said channel and the second of said portions extending at an angle from said first portion and received at least in part in said groove whereby when said tongue part is received in said socket member, said second portion resiliently bears against said wall portion, said channel extending through a nipple included in said tongue part and extending outwardly opposite said surface of said tongue part, said first spring portion extending out of said channel in said nipple whereby said nipple and said first spring portion are received in said artificial tooth prosthesis.

5. Structure in accordance with claim 4 wherein said second spring portion extends in the direction of the underlying gum.

6. Structure in accordance with claim 5 wherein said wall portion includes a depression adapted to receive said second spring portion.

7. In a removable denture, the combination of a socket member for attachment for a pier tooth and a tongue part attached to an artificial tooth prosthesis, said tongue part slidably receivable by said socket member whereby said prosthesis is received in its desired location with said tongue part engaging a wall portion of said socket member, a spring member extending from said tongue part resiliently bearing against said wall portion, said tongue part having a channel which substantially lies in a plane containing a longitudinal axis of said tongue part with the longitudinal axis of said channel being biased relative to the surface of said tongue part engaging said wall portion and having an opening at said surface, a groove in said surface extending from said opening in a direction parallel to the longitudinal axis of said tongue part, a spring received in said channel having two portions, the first of said portions being a shank received in said channel and the second of said portions extending at an angle from said first portion, in a direction away from the underlying gum and received at least in part in said groove whereby when said tongue part is received in said socket member, said second portion resiliently bears against said wall portion.

8. Structure in accordance with claim 7 wherein a second channel extends through said tongue part which is biased relative to said surface of said tongue part in a direction opposite said first mentioned channel and which has an opening at said surface into said groove.

9. Structure in accordance with claim 8 wherein said channels are defined in part by a plate included in said tongue part affixed thereto between said channels, said plate having generally the configuration of a truncated triangle.

10. Structure in accordance with claim 9 wherein said groove is defined in part by the truncated portion of said plate.

11. Structure in accordance with claim 10 wherein a third spring portion extends from said second spring portion into said second channel.

12. Structure in accordance with claim 11 wherein said wall portion includes a depression adapted to receive said second spring portion whereby detent means is comprised by said depression and said second spring portion.

* * * * *